(12) United States Patent
Farine

(10) Patent No.: US 6,185,157 B1
(45) Date of Patent: *Feb. 6, 2001

(54) TIMEPIECE INCLUDING A GPS RECEIVER, ARRANGED IN PARTICULAR, FOR INDICATING THE DIRECTION OF A "TARGET" LOCATION

(75) Inventor: Pierre-André Farine, Neuchâtel (CH)

(73) Assignee: Asulab S.A., Bienne (CH)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/052,020

(22) Filed: Mar. 31, 1998

(30) Foreign Application Priority Data

Apr. 4, 1997 (CH) .................................. 0778/97

(51) Int. Cl.⁷ ......................... G04B 47/00; G04B 47/06; G01C 17/14; H04B 7/185; G01S 5/02

(52) U.S. Cl. .................... 368/10; 368/14; 368/47; 368/80; 33/349; 33/354; 342/357.06; 342/419; 342/443

(58) Field of Search ................................. 368/10, 11, 14, 368/46, 47, 76, 80; 33/271, 355; 342/357.06, 387, 419, 443

(56) References Cited

U.S. PATENT DOCUMENTS 5,173,709  12/1992  Lauro et al. .
5,335,211 * 8/1994  Muto et al. ............................. 368/11
5,550,794 * 8/1996  Born et al. ............................. 368/11
5,790,477 * 8/1998  Hauke ................................... 368/10

FOREIGN PATENT DOCUMENTS 2242027  9/1991  (GB) .
9621139  7/1996  (WO) .

OTHER PUBLICATIONS

Patent Abstracts of Japan, vol. 011, No. 173 (P–582) Jun. 4, 1987 & JP 62 005123 A (Hitachi Ltd; Others:01), Jan. 12, 1987.

* cited by examiner

*Primary Examiner*—Vit Miska
(74) *Attorney, Agent, or Firm*—Sughrue, Mion, Zinn, Macpeak & Seas, PLLC

(57) ABSTRACT

A timepiece (7) including hands (4, 5), direction determining means (10, 11, 14, 12) including data input means (14) arranged for inputting the geographical coordinates of a "target" location in data processing means (12). This timepiece is characterized in that said direction determining means are formed of an antenna (10) and a GPS type receiver (11) for determining the geographical coordinates of the location in which said timepiece (7) is situated, and in that the 6 o'clock–12 o'clock axis of said timepiece (7) is used as a reference axis, and in that at least said first hand (4, 5) is arranged so as to be able to indicate the direction of the "target" location with respect to said reference axis. Such a structure is improved in that it does not need to refer to magnetic north to determine the direction of the "target" location.

4 Claims, 3 Drawing Sheets

A (A1,A2,A3)  A'(A'1,A'2,A'3)  A''(A''1,A''2,A''3)  B (B1,B2,B3)

TIMEPIECE INCLUDING A GPS RECEIVER, ARRANGED IN PARTICULAR, FOR INDICATING THE DIRECTION OF A "TARGET" LOCATION

BACKGROUND OF THE INVENTION

The present invention concerns a timepiece including a GPS receiver, arranged for indicating the direction of a "target" destination or location from a "source" location where the GPS receiver is situated.

Timepieces able to indicate a particular direction are already known. By way of example, European Patent Application No. 95120717.4 can be mentioned, which discloses a timepiece arranged for indicating the direction of Mecca. This Application discloses an analog timepiece which incorporates a compass used to provide a reference axis (which is supplied by the direction of magnetic north).

One problem encountered in a timepiece including a compass lies in the fact that the permanent magnet associated with the compass is disturbed by the magnetic environment of the timepiece assembly. This problem becomes particularly inconvenient when the clockwork movement includes magnetic masses. One incomplete solution to this problem consists in moving the permanent magnet away from the magnetic masses, i.e. increasing the space requirement of the timepiece, which is contrary to the constant preoccupation of watchmakers. Moreover, such timepieces do not provide a simple solution for determining the direction of a "target" location. Such determination must take account of complex physical data such as the deviation between magnetic north and geographical north.

One difficulty for timepiece manufacturers consists in achieving an arrangement for such a timepiece which allows the desired direction to be provided, whilst attending to the usual constraints within the horological industry, such as space requirement.

A conventional solution to the aforementioned difficulty consists in incorporating, within an analog timepiece, a so-called GPS receiver. It will briefly be recalled that the abbreviation GPS designates a device connected to the Global Positioning System, which typically picks up coordinates and time data from a satellite. By way of example, this receiver needs to pick up signals transmitted by four different satellites to determine a location in a three dimensional space (latitude, longitude, altitude). The structure and operation of such a receiver are widely described in the state of the art, in particular in "Radionavigation Systems" by Borge Forssell.

By way of example, International Patent Application No. WO 96/21139 may be cited. This Patent Document mentions the fact that a GPS receiver can be used in a an analog timepiece, without a compass also being used therein. With reference to FIG. 2 of said International Patent Application, the hands of said timepiece indicate an angle W, which allows the timepiece user to move in the direction of a target direction Pn.

However, the Applicant of the present invention has noted that a GPS receiver arranged in an analog timepiece, does not, in itself, allow the direction of the target direction which the timepiece user wishes to know to be provided. Indeed, the Applicant of the present invention observes that said GPS receiver allows said user's spatial position coordinates to be provided, i.e. the direction of the target location in the referential formed by the four satellites, the coordinates of the target location having been previously stored in said GPS receiver. In other words, said user needs to use a reference axis, with respect to which the direction of the location can effectively be defined.

SUMMARY OF THE INVENTION

An object of the present invention is to overcome the aforementioned drawbacks by providing a timepiece arranged for indicating the direction of a "target" direction, without using a compass.

Another object of the present invention is to provide such a timepiece which answers the conventional aesthetic and comfort criteria for an horological application.

These objects and others are achieved by a multi-function timepiece including an internal clock, first and second time display hands, means for selecting functions, direction determining means including data processing means and data input means arranged for inputting the geographical coordinates of a "target" location in said data processing means, said timepiece being characterised in that:

said direction determining means are formed of an assembly including an antenna and a GPS type receiver for determining the geographical coordinates of the location in which said timepiece is situated;

the 6 o'clock–12 o'clock axis of said timepiece is used as a reference axis; and at least said first hand is arranged so as to be able to indicate the direction of the "target" location with respect to said reference axis.

One advantage of the present invention is providing such a timepiece which operates mainly from coordinates provided by the GPS receiver, when the timepiece user moves over a distance of a few meters. Indeed, such a movement provides, via the GPS receiver, a walking direction which can be used as the reference axis via the 6 o'clock–12 o'clock axis of said analog timepiece, if the user moves holding his arm as though continuously reading the time. In other words, the 6 o'clock–12 o'clock axis is used as reference axis, which for example allows use of a compass to be avoided.

Another advantage of the present invention is providing such a timepiece whose structure is simpler than the aforementioned prior art watches.

Another advantage of the present invention is providing such a timepiece whose components can be integrated in a compact structure, which makes the timepiece more aesthetically pleasing with respect to the aforementioned prior art wristwatches.

The objects, features and advantages of the present invention will appear more clearly upon reading the detailed description of a preferred embodiment of the invention, given solely by way of example, in conjunction with the annexed drawings, in which:

DESCRIPTION OF PREFERRED EMBODIMENTS

Figure 1:
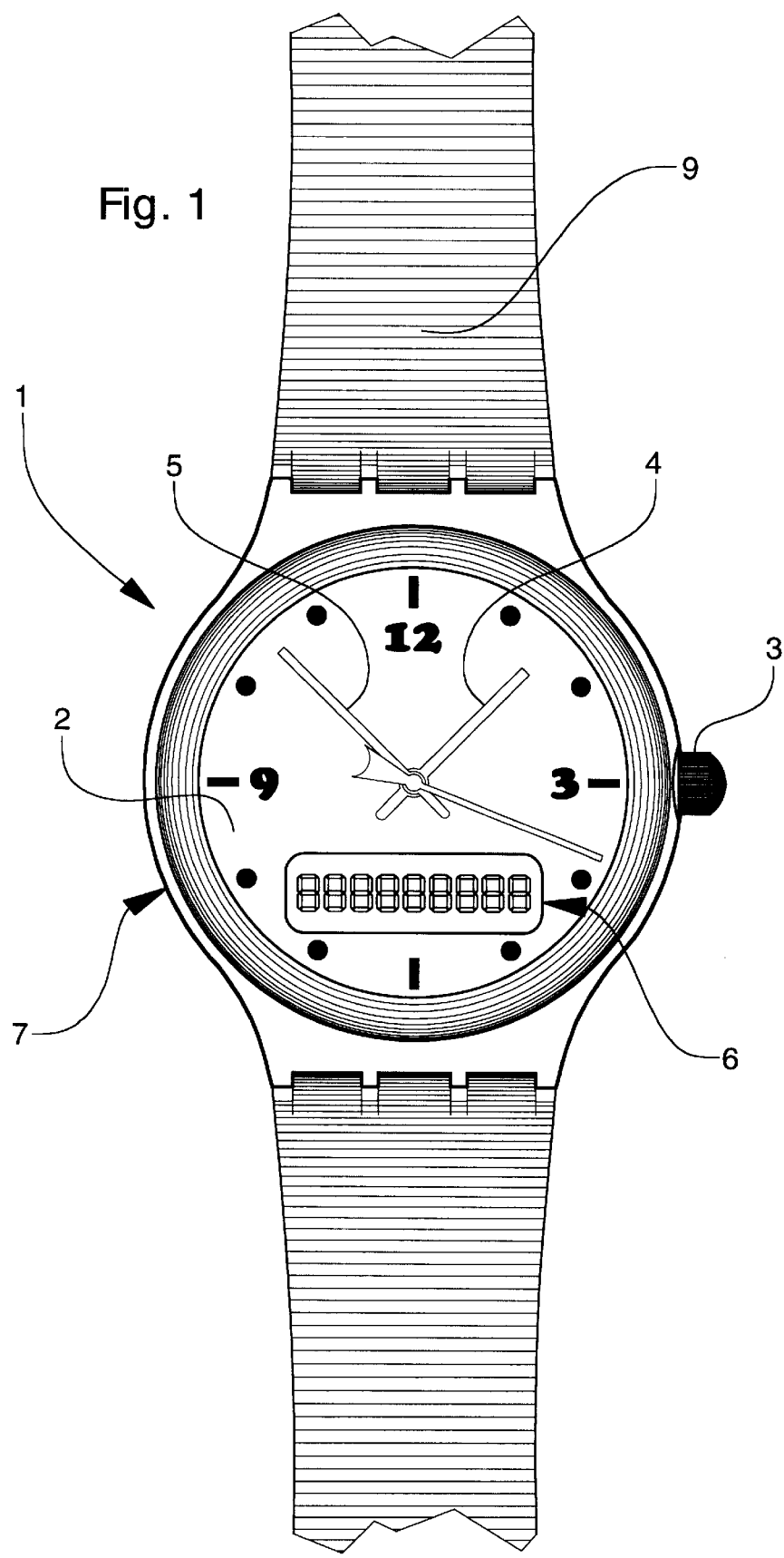
FIG. 1 shows a preferred embodiment of a timepiece according to the present invention.

Generally, a timepiece according to the present invention is used in a wristwatch shown schematically in FIG. 1.

The timepiece according to the present invention is incorporated in a multi-function wristwatch 1 typically comprising a dial 2, a crown 3, a first hand 4 indicating for example the hours, a second hand 5 indicating for example the minutes and display means 6 of the type described in European Patent Application No. 91198796.3 in the name of Eta SA. These different components are included in a case or structure 7 attached to a wristlet 9.

Figure 2:
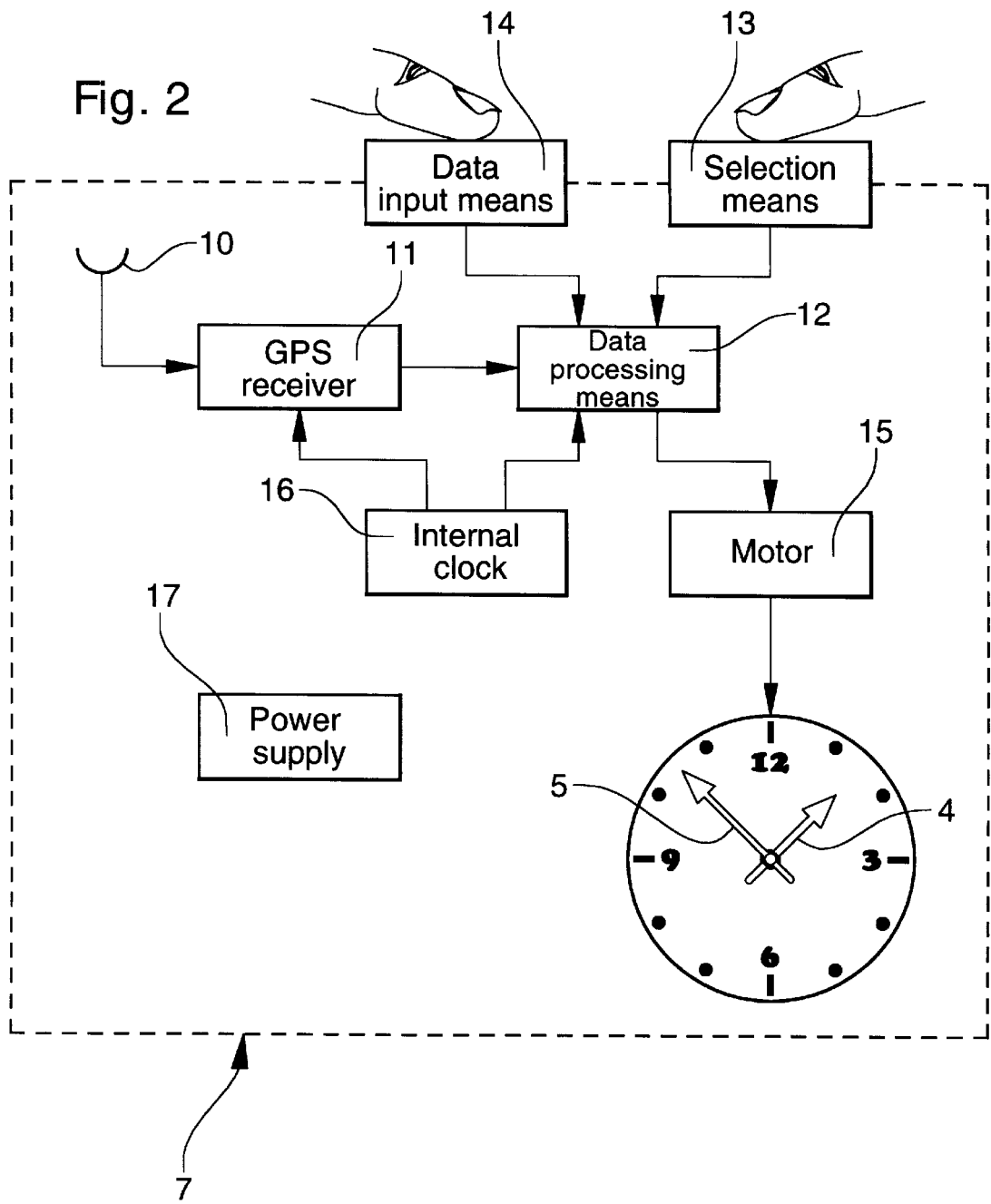
FIG. 2 shows a block diagram of the internal structure of a timepiece according to the present invention.

FIG. 2 shows a block diagram of the internal structure of a timepiece according to the present invention, a preferred embodiment of which is shown in FIG. 1.

Essentially, in addition to the elements mentioned hereinbefore with reference to FIG. 1, structure 7 also includes an antenna 10, a GPS receiver 11, data processing means 12, selection means 13, data input means 14, a motor 15, an internal clock 16 and a power source 17.

Antenna 10 is arranged so as to be able to pick up signals transmitted by a satellite, and includes an output connected to a first input of GPS receiver 11, and may advantageously constitute part or all of dial 2.

Preferably, GPS receiver 11 may advantageously use a SAW filter in the timepiece according to the present invention. With respect to conventional filters (for example ceramic filters), a SAW filter provides similar electric characteristics such as current attenuation, whilst having a smaller size, which is particularly advantageous for watchmaking applications.

The output of GPS receiver 11 is connected to a first input of data processing means 12, typically a microprocessor. Data processing means 12 include a second input connected to the output of selection means 13 which are able to be actuated by the timepiece user, a third input connected to the output of data input means 14, and an output connected to an input of motor 15 connected to hands 4 and 5, and arranged so as to drive hands 4 and 5. A fourth input of data processing means 12 is connected to internal clock 16, as is subsequently described.

Selection means 13 may be formed of a push button arranged in case 7 at the periphery of dial 2 or, preferably combined with the mechanism of crown 3, said selection means 13 being arranged to be able to select different functions.

Data input means 14, used to provide the coordinates of the "target" location to data processing means 12, i.e. the longitude, latitude and altitude, are made in a conventional manner. By way of example, the following solutions of the prior art may be cited. In the event that the timepiece is a wristwatch, European Patent Application No. 95117979.5 in the name of the Applicant of the present invention, discloses first input means by scrolling towns, regions or countries which are displayed on a liquid crystal display when the crown of the wristwatch is rotated. The same Patent Application discloses second input means including a mobile dial fitted with several marks corresponding to several important towns each marked in the vicinity of the respective mark. In this case, it is sufficient for the wristwatch user to select one of the towns on the dial by aligning the minute hand with the corresponding mark.

Moreover, as is known in the art, those skilled in the art can use a stepping motor for motor 15 and, preferably a bidirectional motor to allow rotation of hands 4 and 5 in both directions.

Internal clock 16 (typically a time base associated with a quartz crystal) has a first output connected to a second input of GPS receiver 11, and a second output connected to the fourth input of data processing means 12 to supply a time signal.

The different components of structure 7 shown in FIG. 2 are supplied by a power supply or source 17 such as a battery.

The structure of the type shown in FIG. 2 has numerous advantages. Thus, the use of a bidirectional motor allows rotation of the hands in both directions, which allows a complex movement of the hands to be defined, but also the energy consumption to be reduced.

Figure 3:
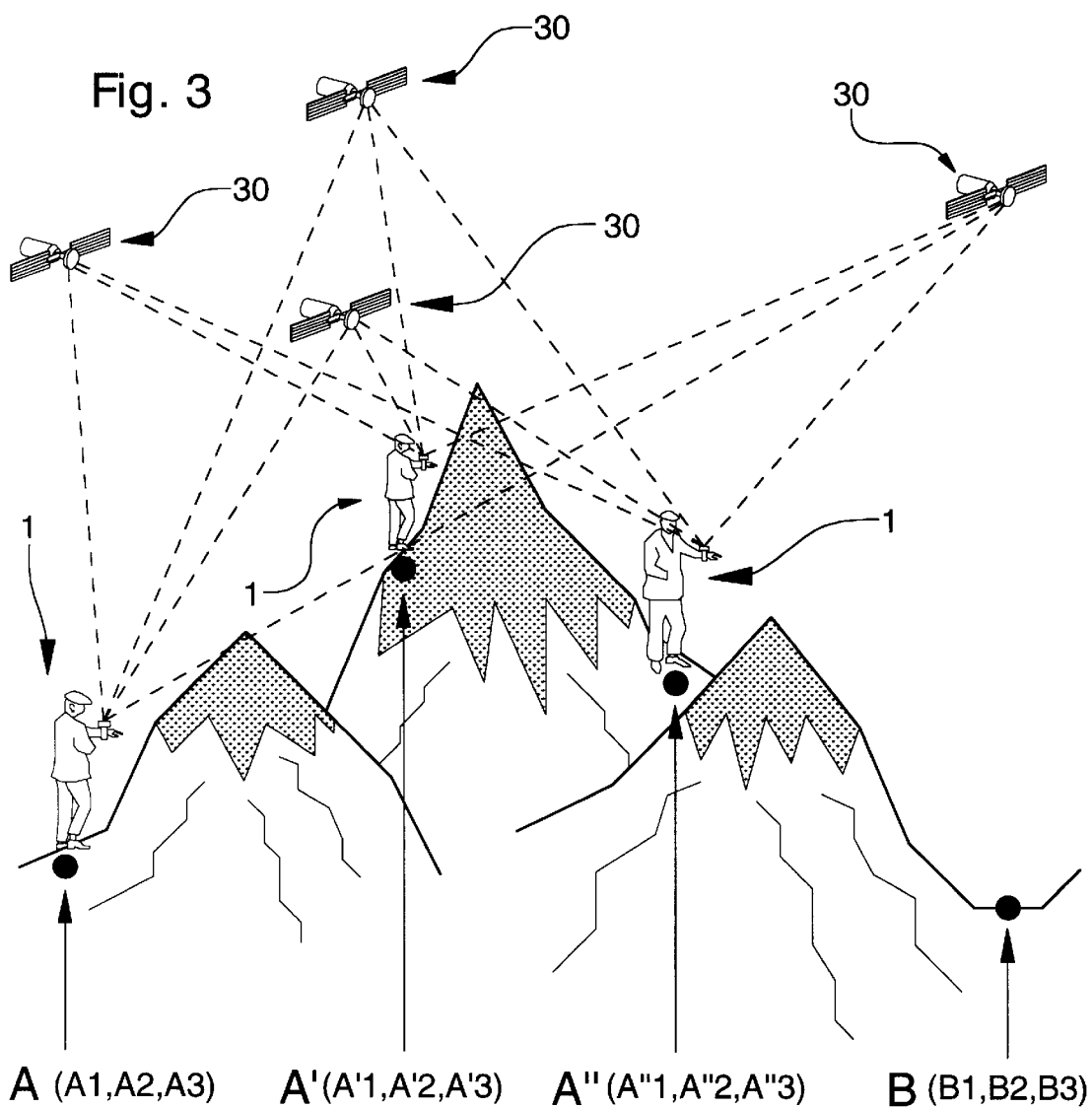
FIG. 3 shows schematically a perspective view of a preferred operating mode of a timepiece according to the present invention.
Figure 4:
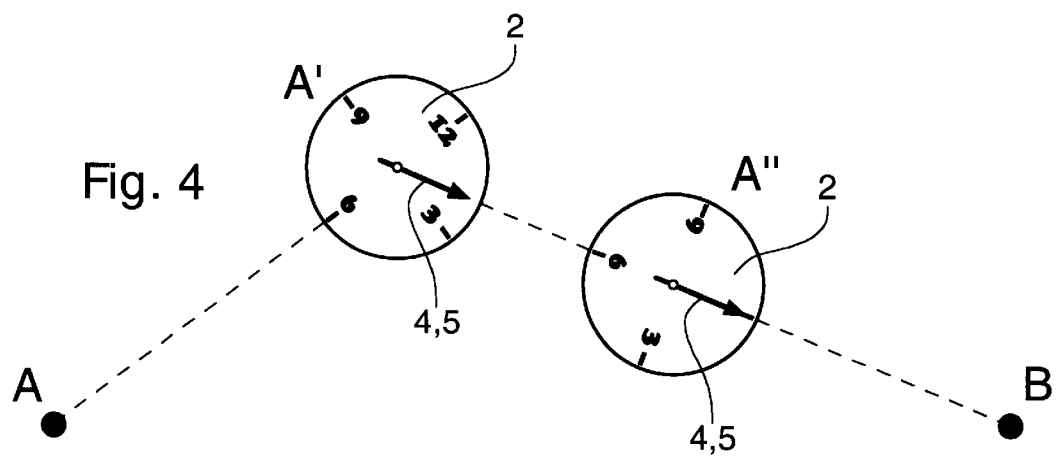
FIG. 4 shows schematically a top view of FIG. 3.

With reference to FIGS. 3 and 4, the operation of the timepiece according to the present invention is as follows.

By way of illustration, the user wearing wristwatch 1 described hereinbefore is initially situated at a point A, and wishes to reach (for example by walking) a point B whose longitude, latitude and altitude he knows, forming a trio of geographical coordinates designated B1, B2 and B3. The user switches on operating mode "direction" by selection means 13, which has the effect, in the preferred embodiment described hereinbefore, of bringing hands 4 and 5 into a superposed position, as is described in the aforecited Patent Document, in order to indicate that a new operating mode has been activated. The user then inputs the trio of coordinates (B1, B2, B3) of point B, the "target" point, by data input means 14. The user must wait to be localised by at least four satellites via GPS receiver 11. GPS receiver 11 then stores the access codes of said satellites to allow it to subsequently pick up data, without having to wait to be localised again. More precisely, GPS receiver 11 picks up the geographical coordinates and the time from at least four satellites and, by a computation algorithm, as is known from the aforecited document "Radionavigation Systems" by B örje Forssell, GPS receiver 11 deduces the position of said user represented by the trio of coordinates (A1, A2, A3), and supplies this data to data processing means 12. Then, he starts to walk in any direction, towards a point A' for example, and the trio of coordinates (A'1, A'2, A'3) is then determined by GPS receiver 11. The operation of the timepiece is described, for example, in relation to four satellites, since at least four satellites are necessary to calculate the trio of coordinates of the location where GPS receiver 11 is situated, as has been mentioned hereinbefore.

Thus, data processing means 12 receive three trios of coordinates: the trio of coordinates (A1, A2, A3) of the "starting" point, the trio of coordinates (A'1, A'2, A'3) of the "walking" point, and the trio of coordinates (B1, B2, B3) of the "target" point. In the example described, the assembly formed by hands 4 and 5 is then moved by the combined action of data processing means 12 and motor 15, as is disclosed in European Patent Application No. 95120717.4. Consequently, if the user uses the 6 o'clock −12 o'clock axis of dial 2 of wristwatch 1 as the reference axis, and aligns this latter with the direction in which he is walking, i.e. the direction between points A and A', hands 4 and 5 will be moved by the combined action of data processing means 12 and motor 15, in a manner such as that disclosed in the aforecited European Patent Application, to indicate the direction in which the user has to walk in order to reach the "target" point, i.e. the direction between point A' and point B. Thus, if the user uses the 6 o'clock–12 o'clock axis of dial 2 of wristwatch 1 as the reference axis, and aligns this latter with the direction in which he is walking, the user heads towards the "target" point, when the assembly formed of hands 4 and 5 is perfectly aligned with the 6 o'clock–12 o'clock axis, as is shown in FIG. 4 at point A.

By way of example, in the case of the application of the present invention described hereinbefore, it is sufficient for the user to walk a distance of approximately thirty meters, to receive an indication of the direction of the "target" point, this distance depending on the resolution of the GPS receiver.

By way of alternative, modifications or improvements may be made to the timepiece described in detail hereinbefore.

By way of alternative, the timepiece according to the present invention can also be fitted with a liquid crystal display of the type disclosed in European Patent Application No. 91108796.3 in the name of Eta SA, so that such an assembly provided with memory means allows former or predetermined positions to be displayed.

By way of alternative, the timepiece according to the present invention can also be fitted with temperature compensating means in combination with internal clock 16, for example by using a temperature controlled crystal oscillator (TXCO). It is particularly advantageous to use such compensating means with a GPS receiver. Indeed, the more accurate the internal clock, the more rapid the search for satellites allowing the position of the receiver to be determined, the ideal situation being the absence of any difference between the clock signal originating from a satellite and the internal clock signal. Consequently, such compensating means make the timepiece reliable to use, even in extreme climates.

By way of alternative, the timepiece according to the present invention may be modified so that one of the hands 4, 5 is able to indicate the direction of geographical north, the other hand indicating the direction of the "target" location.

By way of alternative, the timepiece according to the present invention can also be associated with an external apparatus capable of being used, for example, for displaying a navigation map.

Also by way of alternative, the timepiece according to the present invention can include two bidirectional motors, so that the movement of the hands of the timepiece can be more complex. The second bidirectional motor can also allow the timepiece according to the present invention to be fitted with an additional hand for indicating, for example, the seconds.

It goes without saying that those skilled in the art can make a good number of additional modifications and improvements to the detailed description of the analog timepiece according to the present invention, without departing from the scope thereof. By way of example, a different axis to the 6 o'clock–12 o'clock axis of the timepiece may be used, this other axis being formed by a direction displayed on the timepiece and by the spatial position of the user himself.

What is claimed is:

1. A multi-function timepiece including an internal clock, first and second time display hands, selection means for selecting functions, direction determining means including data processing means and data input means arranged for inputting the geographical coordinates of a "target" location to said data processing means, wherein said direction determining means further include an assembly including an antenna and a GPS type receiver for determining the geographical coordinates of the location in which said timepiece is situated and for providing the determined geographical coordinates to said data processing means, wherein said data processing means function to determine a direction of movement of said timepiece from geographical coordinates of the location in which said timepiece is currently situated and from geographical coordinates of the location in which said timepiece was previously situated, wherein said data processing means further function to determine a "target" direction from said geographical coordinates of the inputted "target" location and from the geographical coordinates in which said timepiece is currently situated, wherein the 6 o'clock–12 o'clock axis of said timepiece is used as a reference axis which is aligned with said direction of movement, wherein said first hand is arranged so as to be able to indicate said "target" direction with respect to said reference axis, and said second hand is arranged so as to be able to indicate the direction of geographical north.

2. A timepiece according to claim 1 further including means for compensating the temperature of said internal clock, so that said timepiece is made more reliable, such an arrangement increasing the accuracy of said timepiece.

3. A timepiece according to claim 1, wherein said data processing means are formed by a microprocessor.

4. The multi-function timepiece according to claim 1, wherein said timepiece is compass-free, and comprises a motor, responsive to said data processing means, for moving said first hand to a position in which said first hand points in said direction of the target location.

* * * * *